Aug. 26, 1941. H. F. BAKEWELL 2,253,492
MACHINE TOOL
Filed Feb. 7, 1940  5 Sheets-Sheet 3

INVENTOR.
Harding F. Bakewell,
BY
ATTORNEY.

Patented Aug. 26, 1941

2,253,492

UNITED STATES PATENT OFFICE 2,253,492

MACHINE TOOL

Harding F. Bakewell, San Marino, Calif.

Application February 7, 1940, Serial No. 317,688

14 Claims. (Cl. 10—129)

This invention relates to machine tools in which cooperating elements, i. e. a tool and the work, are adapted for relative rotation and relative axial feed, and more particularly to machine tools in which relative rotation of these cooperating elements determines relative axial displacement of interfitting and relatively rotatable threaded-guides, and relative axial displacement of the threaded-guides determines relative axial feed of the tool and the work.

It is an object of the invention to control relative axial feed of the cooperating elements, i. e. the tool and the work, by an operating connection between one of the interfitting threaded-guides and that one of the cooperating elements (either the tool or the work) which is adapted for axial feed, with the operating connection arranged whereby the interfitting threaded-guides may be remote from the element which is adapted for axial feed.

More particularly, it is an object of the invention to provide a fluid-displacement operating connection for that element (either the tool or the work) which is adapted for axial feed.

It is a further object of the invention to relatively rotate the interfitting threaded-guides by that one of the cooperating elements (either the tool or the work) which is adapted for rotation and which is fixed against axial displacement, whereby one of the threaded-guides is adapted for axial displacement as determined by the pitch of the interfitting threaded-guides, and to operatively connect the axially displaceable threaded-guides to the other element (either the work or the tool) which is adapted for axial feed and which is fixed against rotation, whereby the non-rotatable element is fed axially relative to the rotatable element as determined by relative axial displacement of the interfitting threaded-guides.

It is a still further object of the invention to vary the relative axial feed of the tool and the work while employing the same interfitting threaded-guides; and more particularly, to vary this relative axial feed by varying the relative rotation of the interfitting threaded-guides with relation to relative rotation of the tool and the work.

Further objects of the invention will be readily understood from the following description of the accompanying drawings which illustrate forms which the invention may assume in practice, it being understood that the forms which are shown and described are for the purpose of illustration, and that the invention may be modified and is entitled to various forms without departing from the scope of the appended claims.

The invention is applicable to tapping or other machine tools in which the tool is rotatable relative to non-rotating work, and is also applicable to thread-cutting machines, turret lathes and the like in which the work is rotatable relative to a non-rotating tool. The invention is also applicable to machines in which axial feed is by movement of either the tool or the work.

The invention is particularly applicable to a tapping machine in which the tool is rotatable but fixed against axial displacement and the work is non-rotatable but adapted for axial feed relative to the rotating tool. This embodiment of the invention is illustrated at Figs. 1 to 7.

Figure 9:
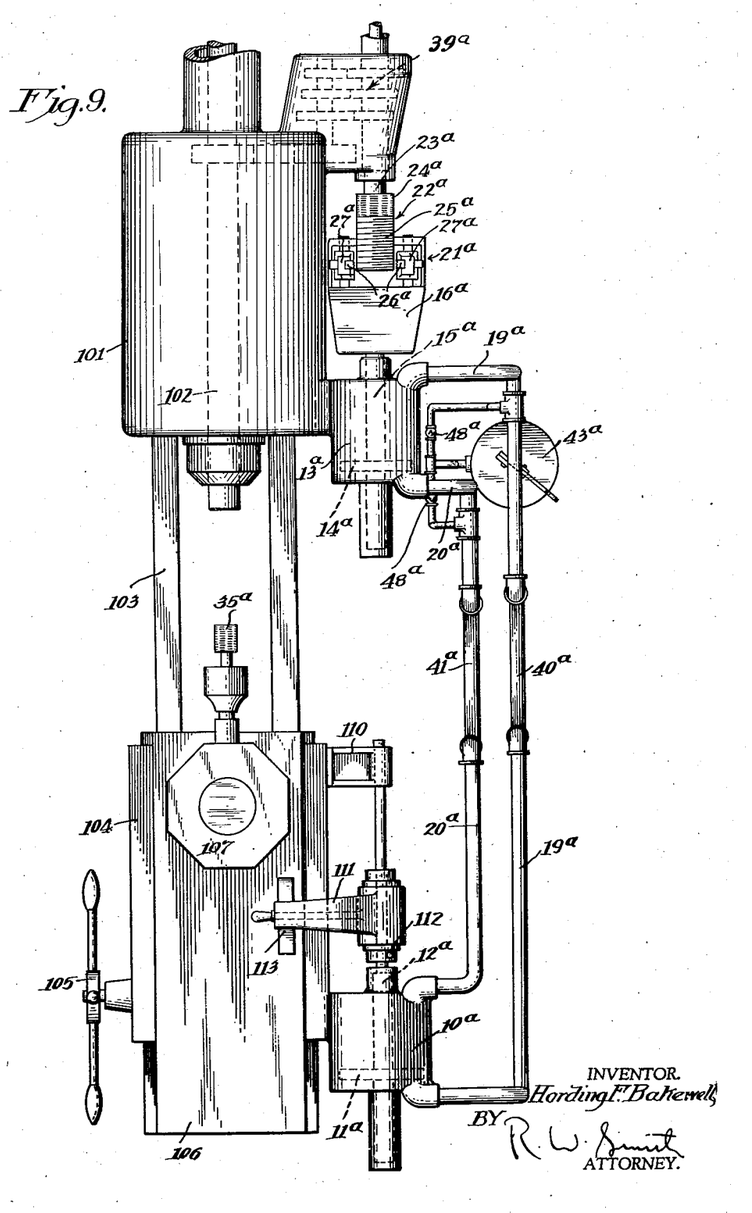
Fig. 9 is a plan view of a modification of the invention.
Figure 10:
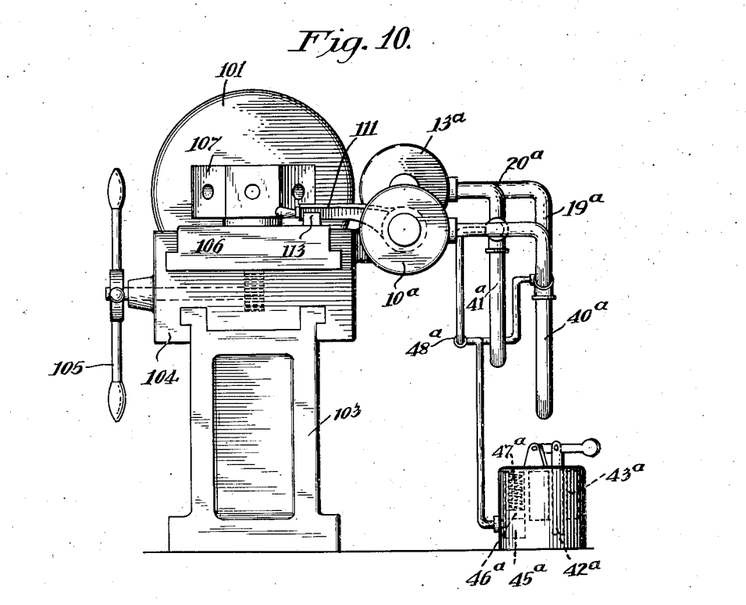
Fig. 10 is an end elevation of the same.
Figure 11:
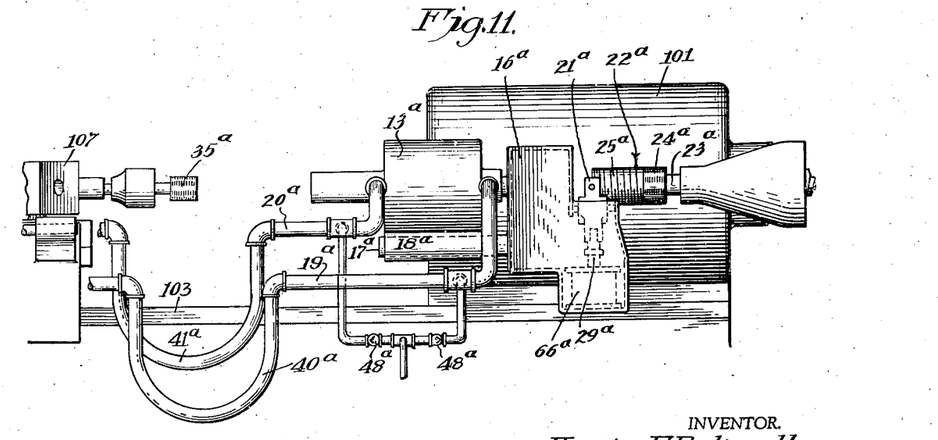
Fig. 11 is a fragmentary side elevation of the same.

The invention is also particularly applicable to a machine such as a turret lathe in which the work is rotatable but fixed against axial displacement and the tool is non-rotatable but adapted for axial feed relative to the rotating work. This embodiment of the invention is illustrated at Figs. 9 to 11.

Referring to Figs. 1 to 7, a frame 1 for a rotatable spindle 2 is mounted on a column 3, and a support 4 is vertically adjustable on the column and supports a work table 5 which is adapted for axial feed relative to the rotating spindle. The spindle 2 is journaled in the frame 1 against axial displacement and may be rotated by a motor 6 via a selective-speed driving connection 7. The driving connection 7 preferably includes a tensioned clutch 8 which is manually adjustable as shown at 9, whereby it is adapted to yield and thus stop rotation of the spindle 2 at predetermined torque capacity of the machine.

The work table 5 is adapted for axial feed by an operating connection which is preferably a fluid-displacement operating connection such as described and claimed in my copending application Ser. No. 393,365, filed March 14, 1941. As an instance of an operating connection of this type, embodied in the machine tool which constitutes the present invention, a cylinder 10 is mounted on the support 4 with a piston 11 adapted for reciprocation in the cylinder and with the work table 5 supported on the rod 12 of the piston; and a second cylinder 13 is mounted on the frame 1 with a piston 14 adapted for reciprocation in this cylinder and with the rod 15 of the piston connected to one of relatively rotatable interfitting threaded guides 21—22.

In the illustrated embodiment, the piston rod 15 is connected to the threaded-guide 21. As an instance, the threaded-guide 21 is mounted in a frame 16 which depends from the piston rod 15. The frame 16 and the threaded-guide 21 are fixed against rotation but are axially displaceable relative to the cooperating threaded-guide 22, preferably by a guide rod 17 of the frame 16 sliding in a bearing guide 18 which is supported by the cylinder 13, and the threaded-guide 22 is adapted for rotation by the spindle 2 but is fixed against axial displacement.

Conduit 19 connects the upper end of the cylinder 13 with the lower end of the cylinder 10, and conduit 20 connects the lower end of the cylinder 13 with the upper end of the cylinder 10. The cylinders and their connecting conduits form a fluid-displacement system which is filled with a substantially non-compressible fluid such as oil. By rotating the threaded-guide 22 (through rotation of the spindle 2) the cooperating threaded-guide 21 and the frame 16 are thus axially displaced in accordance with thread-lead of the interfitting threaded-guides 21—22, and the piston 14 is thus displaced in its cylinder 13, thereby displacing the oil in the system so as to correspondingly displace the piston 11 in its cylinder 10 and thus shift the work table 5 relative to the support 4 for axial feed relative to the rotatable spindle 2.

The threaded-guide 22 is an externally threaded sleeve detachably mounted on a shaft 23 which is journaled in the frame 1, with a rotary driving connection 39 between the spindle 2 and the shaft 23; and the cooperating threaded-guide 21 which is mounted on the frame 16 is an internally threaded element adapted for threaded engagement with the externally threaded sleeve 22.

The cooperating threaded-guides 21—22 are preferably of the type disclosed and claimed in my copending application Ser. No. 297,697, filed October 3, 1939; i. e. the guide 22 is adapted to first cut the desired thread in the guide 21 and to thereafter make threaded engagement therewith, and means are provided for maintaining snug engagement between the guides 21—22 while the thread is being cut in the guide 21 and throughout subsequent threaded engagement of the guides.

As an instance, the external periphery of the threaded sleeve 22 preferably includes a hob 24 for cutting threads in the guide 21 and a pilot 25 which has a thread corresponding to the threads which have been cut in the guide 21.

In order to maintain snug engagement between the guides 21—22, the guide 21 preferably comprises a pair of blocks 26 which engage the periphery of the guide 22 at diametrically opposite points and which are supported by arms 27 which are pivotally mounted in the frame 16 as shown at 28.

By means of an actuating rod 29 and links 30, the pivoted arms 27 may be swung to operative position engaging the blocks 26 with the cooperating threaded-guide 22 or may be swung to inoperative position shifting the blocks clear of the cooperating threaded-guide. Springs 31 tend to project the rod 29 so as to swing the pivoted arms to inoperative position, but the rod 29 is adapted for retraction against the tension of the springs for swinging the pivoted arms to operative position. Springs 32 are mounted in bores 33 in the links 30, with slotted pivotal connections 34 between the arms and the links, These springs are so tensioned that when the arms 27 are in operative position, the springs 32 maintain threaded-engagement between the blocks 26 and the cooperating threaded-guide 22 and tension this threaded-engagement so as to urge the blocks into snug threaded-engagement with the cooperating threaded-guide.

The rotary driving connection 39 is preferably a selective-speed driving connection comprising a plurality of different drive ratios which are adapted for selective engagement at the will of the operator and whereby the shaft 23 and the threaded-guide 22 may be rotated at the same speed or at predetermined lower or higher speed than that of the spindle 2. Taps 35 which are selectively fixed for rotation with the spindle 2 and which are respectively threaded at different pitch may thus be used in the machine, while employing the same pair of cooperating threaded-guides 21—22.

For example, with predetermined pitch of the cooperating threaded-guides 21—22 and with one-to-one drive ratio between the spindle 2 and the shaft 23, relative axial displacement of the cooperating threaded-guides will feed the work table 5 relative to the rotating tap 35 so as to adapt the machine for tapping operation when employing a tap which has the same pitch as the cooperating threaded-guides. When employing the aforementioned interfitting threaded-guides, but selecting a different drive ratio for the shaft 23, relative axial displacement of the cooperating threaded-guides will feed the work table 5 relative to the rotating tap 35 so as to adapt the machine for tapping operation when using a tap which has a pitch different from that of the cooperating threaded-guides as determined by the selected drive ratio.

In practice, the selective-speed driving connection 39 may include gearing 36 of one-to-one drive ratio, gearing 37 of predetermined higher drive ratio, and gearing 38 of predetermined lower drive ratio, with the gearing 36—37—38 adapted for selective engagement by usual manually controlled means (not shown).

In order to permit adjustment of the support 4 along the column 3 for desired positioning of the work table 5 relative to the tap 35, the conduits 19—20 include flexible portions 40—41 which permit relative axial displacement of the cylinders 10—13 while maintaining the conduit connections between the cylinders.

Means are preferably provided for automatically maintaining the fluid-displacement system filled to capacity, against possible leakage. For this purpose, a pump 42 (which may be manually operated) and a reservoir 43 are included in the fluid-displacement system, with the pump adapted to pump fluid from the reservoir via check valves 44 to a compensating chamber 45 which communicates via check valves 48 with the respective conduits 19—20. A piston 46 is adapted for retraction in the chamber 45 against the tension of a spring 47 and responsive to pressure in the chamber 45.

By manually operating the pump 42, the fluid-displacement system is filled to capacity, with the pressure of the fluid retracting the piston 46 in the chamber 45 so as to tension the spring 47 as indicated at a gauge 49 and with the check valves 48 closing against discharge of fluid from that portion of the system which includes the cylinders 10—13 and the conduits 19—20. Displacement of piston 14 responsive to axial displacement of the frame 16 and the threaded-guide 21, thus causes corresponding displacement of the piston 11 for axially feeding the work table 5 in exact accordance with axial displacement of the threaded-guide 21. In the event of leakage from the system, the tensioned spring 47 projects the piston 46 into the chamber 45, thereby contracting this chamber so as to compensate for the leakage and again fill the system to capacity.

An electrical control is preferably employed, whereby the motor 6, which is reversible, is first driven in one direction and the rod 29 is retracted for engaging the threaded-guides 21—22, thereby axially displacing the threaded-guide 21 and the frame 16 responsive to relative rotation of the cooperating threaded-guides so that the fluid-displacement operating connection axially feeds the work table 5 relative to the rotating tap 35 for tapping the work to the desired depth, whereupon the motor 6 is automatically reversed (with the rod 29 still retracted for maintaining engagement of the threaded-guides 21—22), thereby axially displacing the guide 21 and the frame 16 in the opposite direction so that the fluid displacement operating connection reversely feeds the work table 5 for threaded retraction of the tapped work from the now reversely rotating tap. When the work is clear of the tap, the motor 6 is automatically stopped and the rod 29 is projected by its spring 31, thereby disengaging the threaded-guides 21—22 and thus completing the cycle of operation.

Figure 2:
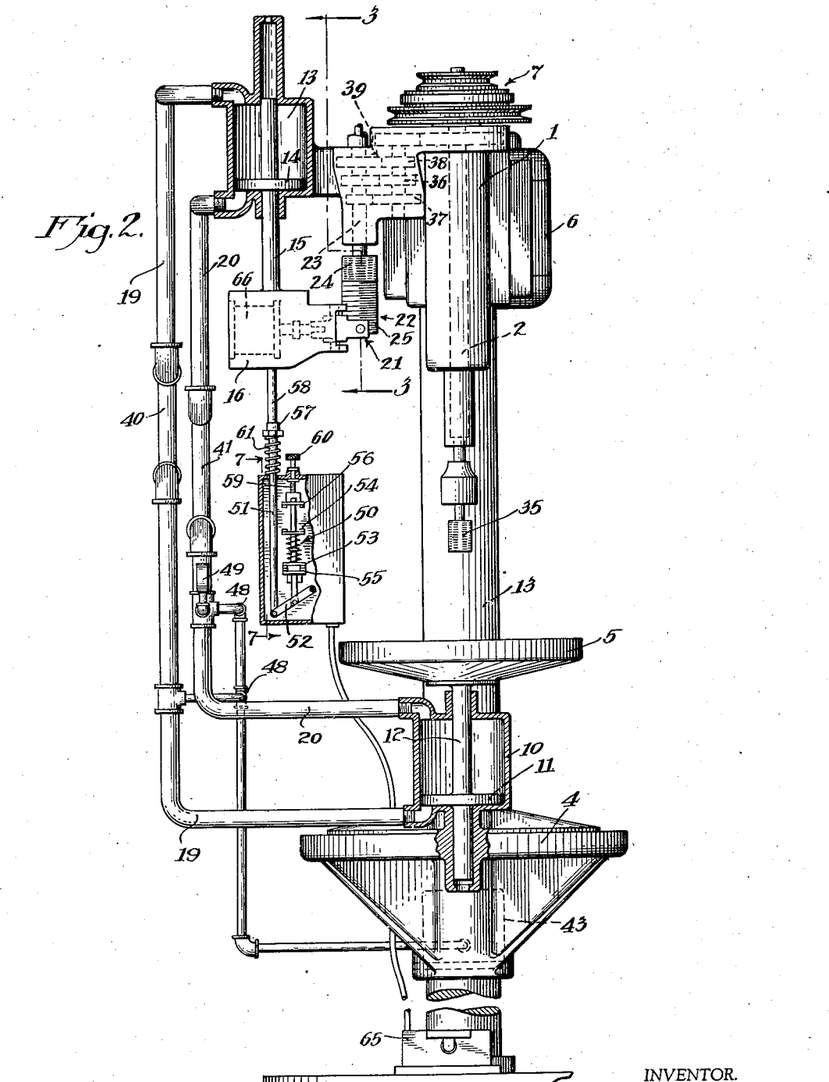
Fig. 2 is a front elevation, partly in section.
Figures 3, 4, 5, 6, 7, 8:
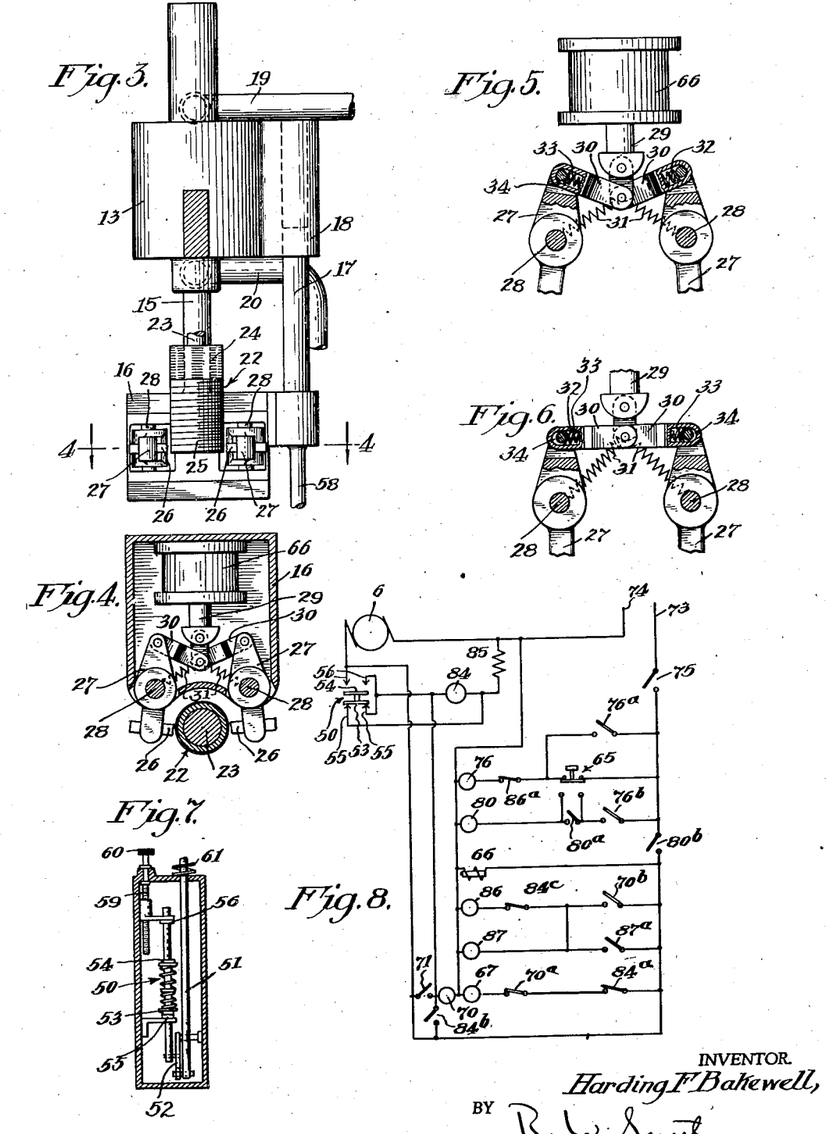
Fig. 3 is a section on the line 3—3 of Fig. 2.
Fig. 4 is a section on the line 4—4 of Fig. 3.
Figs. 5 and 6 are detail plan views of the linkage of Fig. 4, showing inoperative and operative positions respectively.
Fig. 7 is a section on the line 7—7 of Fig. 2.
Fig. 8 is a diagram of an electrical control which is particularly applicable to that embodiment of the invention which is shown at Figs. 1 to 7.

As an instance, the electrical control which is shown at Figs. 2, 7 and 8 may be employed.

A two-way electrical switch 50 is adapted for shifting from one contact to the other responsive to axial displacement of the threaded-guide 21 along the pilot 25 of the cooperating threaded-guide 22. For this purpose, a lever 52 which is actuated by a rod 51 shifts the switch 50 so as to engage its respective contacts 53—54 with cooperating contacts 55—56 at respective terminal travel of the lever. The rod 51 is spring tensioned as shown at 61 so as to tend to shift the switch 50 for engaging its contacts 54—56, and the switch is shifted in the opposite direction so as to engage its contacts 53—55, by an abutment 57 engaging a forked end of the rod 51. The abutment 57 is mounted on a rod 58 which depends from and which is shiftable with the frame 16 and which is slidable in the forked end of the rod 51.

The parts are relatively assembled so that when the frame 16 is in position with the piston 14 at the lower end of the cylinder 13 and with the blocks 26 opposite the lower end of the pilot 25, the abutment 57 will have engaged and retracted the rod 51 against the tension of its spring 61 so as to close the contacts 53—55. As the frame 16 and the threaded-guide 21 are then moved upwardly relative to the guide 22 in response to threaded engagement of the relatively rotating guides, the spring 61 projects the rod 51 so that it follows upward travel of the abutment 57, for first opening the contacts 53—55 and subsequently closing the contacts 54—56. The limit of this spring projection of the rod 51 is when the frame 16 has been moved upwardly until the blocks 26 are opposite the upper portion of the pilot 25; but the rod 58 by freely sliding through the forked end of the rod 51 is adapted for continued upward travel relative to the rod 51 so that the frame 16 may be moved upwardly to a position in which the blocks 26 are opposite the hob 24 of the cooperating guide 22. The contact 56 is adjustable by a threaded rod 59 and a manual control 60, whereby it is adapted for engagement by the contact 54 when the blocks 26 have traveled upwardly any predetermined distance along the pilot 25.

Figure 1:
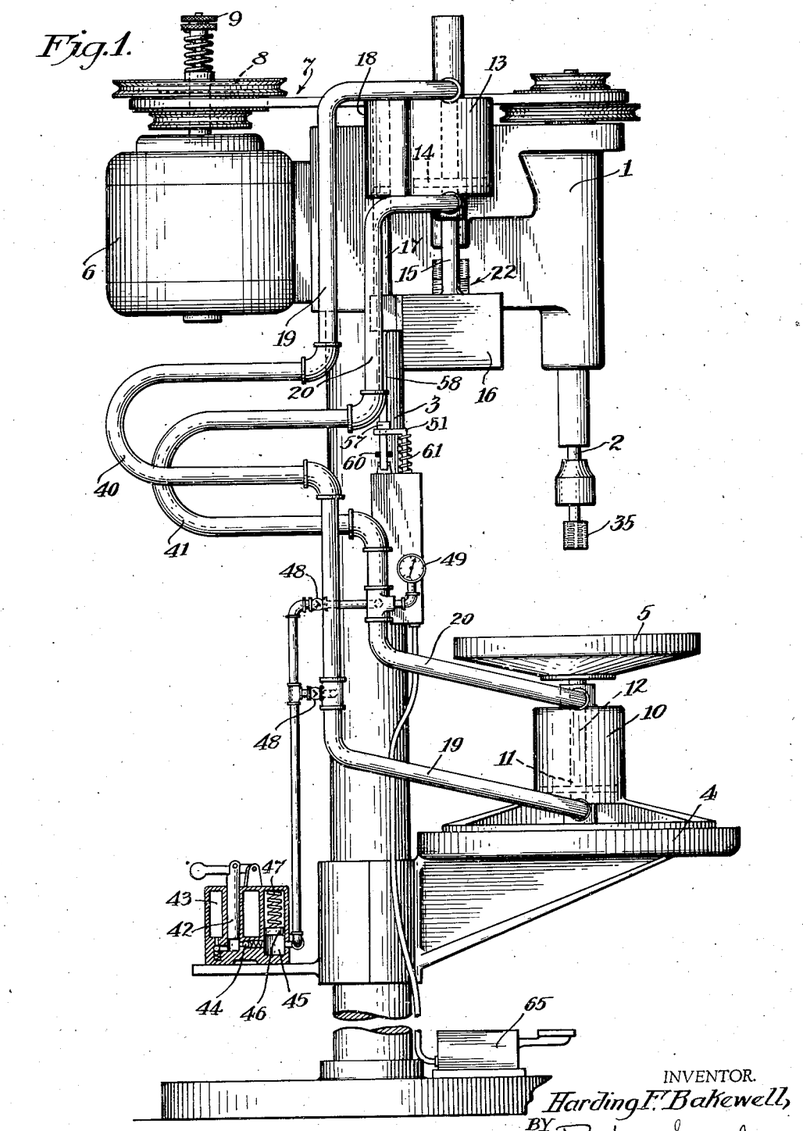
Fig. 1 is a side elevation of an embodiment of the invention.

As shown at Fig. 8, electrical energy is supplied from a suitable source via leads 73—74, and thence via a master switch 75 which is closed when the machine is to be operated and which may be opened at any time for stopping the cycle of operation. A switch 65 which is preferably foot operated as shown at Fig. 1, is normally spring projected so as to close its upper contacts. With the switch 65 in this normal position, closing the switch 75 energizes a pilot relay 76 via the closed upper contacts of the switch 65 and via a normally closed contact 86a; and when the pilot relay 76 is thus energized it closes the normally open contacts 76a—76b.

The piston 14 being at the lower end of its cylinder 13 so that the contacts 53—55 of the switch 50 are closed, the operator starts the cycle of operation by shifting the switch 65 so as to open its upper contacts and then close its lower contacts; and when the switch 65 is thus shifted, the closed contact 76a continues to energize the pilot relay 76. Closing the lower contacts of the switch 65 energizes a relay 80 which closes the normally open contacts 80a—80b. The switch 65 may then be released for spring projection to its original position, with the closed contact 80a continuing to energize the relay 80 so that the contact 80b remains closed for continuing the cycle of operation to completion.

The closed contact 80b energizes a solenoid 66 which retracts the rod 29 against the tension of springs 31 so as to engage the cooperating threaded-guides 21—22; and the closed contact 80b also energizes a relay 67 via the normally closed contacts 84a—70a. Energizing the relay 67 operates the motor 6 for rotating the spindle 2 in the direction for operative rotation of the tap 35 and for rotating the shaft 23 and the threaded-guide 22 in the direction for upward threaded travel of the threaded-guide 21. This travel of the guide 21 causes corresponding upward travel of the frame 16, whereby the work table 5 is fed upwardly via its fluid-displacement operating connection, for feeding the work relative to the rotating tap so as to tap the work.

The rod 58 travels upwardly with the frame 16, and the rod 51 is thus projected by its spring 61 so as to follow upward travel of the abutment 57. The switch 50 is thus shifted so as to open its contacts 53—55 as soon as the cycle of operation has started (but opening the contacts 53—55 does not affect the circuit thus far traced and the motor 6 therefore continues to rotate in the direction for continuing the tapping operation); and said shifting of the switch 50 then closes its contacts 54—56 when the blocks 26 have been threaded upwardly along the pilot 25, a distance determined by adjustment of the contact 56. The contacts 54—56 are thus closed when the work has been fed such distance relative to the rotating tap as will have tapped the work to predetermined depth.

Closing the contacts 54—56 energizes a relay 84, the circuit for which includes a resistor 85; and the energized relay 84 opens the normally closed contact 84a and closes a normally open contact 84b. Opening the contact 84a deenergizes the relay 67 which stops the motor 6, and closing the contact 84b energizes a relay 70. Energizing the relay 70 operates the motor 6 in the reverse direction, for reversely rotating the tap 35 and for reversely threading the guide 21 along the cooperating guide 22. Energizing the relay 70 also opens the normally closed contact 70a for breaking the circuit to the relay 67 at this contact 70a as well as at the now open contact 84a.

Downward travel of the guide 21 relative to the guide 22 causes corresponding downward travel of the frame 16, and via the fluid-displacement operating connection thus causes downward feed of the table 5 for threaded retraction of the tapped work from the now reversely rotating tap. During this reverse feed of the tapped work, the abutment 57 retracts the rod 51 against the tension of its spring 61, thereby opening the contacts 54—56 of the switch 50 as soon as reverse feed has started, but the relay 84 remains energized via the circuit which has been completed by closing the normally open contact 84b, thereby continuing to energize the relay 70 so as to continue the reverse feed of the work. When the work has been retracted so as to clear the tap 35, i. e. when the piston 14 is again at the lower end of its cylinder 13 and the blocks 26 are again opposite the lower end of the pilot 25, the abutment 57 will have shifted the rod 51 so as to again close the contacts 53—55 of the switch 50. Closing these contacts completes a circuit which shunts out and thus deenergizes the relay 84.

When the relay 84 is thus deenergized, the contact 84b opens to its normal position, thereby deenergizing the relay 70 which stops the motor 6 at the end of the cycle of operation; and by deenergizing the relays 70—84 the contacts 70a—84a close to their normal position, but closing these contacts does not again energize the relay 67 for restarting the motor 6, since the contact 80b is automatically shifted to its normal open position at the end of the cycle of operation. Opening the contact 80b, not only prevents restarting the motor 6, but also deenergizes the solenoids 66 so that the rod 29 is projected by its springs 31, thereby disengaging the cooperating threaded-guides 21—22. The machine is thus stopped with its parts in their original position, ready for repeating the cycle of operation.

The contact 80b is automatically opened at the end of the cycle of operation, even if the operator should have failed to permit spring projection of the switch 65 to its normal position closing its upper contacts and opening its lower contacts. As an instance, a relay 86 controls the normally closed contact 86a, and at the end of the cycle of operation the relay 86 is energized via contacts 87a—84c, the contact 84c being controlled by the relay 84 and the contact 87a being controlled by a relay 87. A normally open contact 70b energizes the relay 87 when the contact 70b is closed, and the contact 70b is controlled by the relay 70.

At the start of the cycle of operation, the contact 84c is in normal closed position but the relays 86—87 are deenergized by the normally open contacts 70b—87a. The contact 86a is thus in normal closed position for starting the cycle of operation by depressing the switch 65 as previously described. When the work has been tapped to the desired depth, at which time the relays 70—84 are energized as previously described, the relay 70 closes the normally open contact 70b so as to energize the relay 87 and thus close the normally open contact 87a, and the relay 84 opens the normally closed contact 84c so as to prevent the relay 86 becoming energized. The relay 87 thus remains energized and the contact 87a remains closed during retraction of the tapped work from the tap.

At the end of the cycle of operation, deenergizing the relay 84 as previously described, permits contact 84c to close to its normal position for energizing the relay 86 via the closed contacts 87a—84c, and deenergizing the relay 70 permits the contact 70b to open to its normal position. Energizing the relay 86 opens the normally closed contact 86a, thereby deenergizing the relay 76 whether the switch 65 is closing its upper or its lower contacts; and deenergizing the relay 76 permits the contacts 76a—76b to open to their normal position, thereby deenergizing the relay 80 whether the switch 65 is closing its upper or its lower contacts. Deenergizing the relay 80 permits the contacts 80a—80b to open to their normal position; and opening the contact 80b not only deenergizes the solenoid 66 and breaks the circuits to the relays 67—70 as previously described, but also deenergizes the relays 86—87 so that the contact 86a closes to its normal position and the contact 87a opens to normal position.

The parts are then in the position first described, whereby closing the switch 65 at its upper contacts first energizes relay 76 so as to prepare for repeating the cycle of operation, and shifting the switch 65 so as to open its upper contacts and close its lower contacts then repeats the cycle of operation.

A normally open switch 71 is adapted to be manually closed in an emergency; and when closed it completes circuits which energize the relays 70—84 irrespective of the position of the switch 50. Energizing the relay 84 opens the contact 84a and thus deenergizes the relay 67 so as to prevent operation of the motor 6 in the direction for tapping operation; and energizing the relay 70 operates the motor 6 in the reverse direction for retracting work from the tap as previously described. Energizing the relay 84 also opens the contact 84c so that the cycle of operation continues to completion as previously described, whereupon the relay 84 is shunted out by the abutment 57 shifting the rod 51 so as to close the contacts 53—55 of the switch 50. As previously described, the contact 84c is thus permitted to close to its normal position, thereby permitting the contact 80b to open to its normal position; and the cycle of operation is thus arrested at completion whether or not the switch 71 has been reopened and irrespective of the position of the switch 65.

Before using the tap 35 of the machine in the cycle of operation above described, the hob 24 cuts cooperating threads in the blocks 26. For this purpose and with the arms 27 swung to inoperative position, the work table 5 and the frame 16 are dependently manually elevated via their fluid displacement operating connection, until the blocks 26 (with no threads cut therein) are above the pilot 25 and opposite the upper end of the hob 24 of the cooperating guide 22. The abutment 57 will have thus been elevated so that the rod 51 will have been spring projected to its limit of movement, thereby closing the contacts 54—56 of the switch 50 when the frame 16 has been elevated so as to position the blocks 26 opposite the upper end of the pilot 25; and as the elevation of the frame 16 is then continued for positioning the blocks 26 opposite the upper end of the hob 24, the rod 58 slides freely through the forked end of the rod 51, which has reached its limit of movement, thereby spacing the abutment 57 above the forked end of the rod 51.

The master switch 75 is then closed and the switch 65 is depressed so as to open its upper contacts and then close its lower contacts. The contact 80b is thus closed as previously described, thereby energizing the solenoid 66 so as to engage the blocks 26 with the upper end of the hob 24. Closing the contact 80b also energizes the relay 70 (with the relay 67 remaining deenergized) since it is the contacts 54—56 of the switch 50 which have been closed. The motor 6 is thus operated in the direction for so rotating the hob 24 that relative downward feed of the blocks 26 will cause the rotating hob to cut a corresponding thread in the blocks; and as soon as the hob has started this thread in the blocks, the pitch of the hob provides the lead for downwardly feeding the blocks.

When the blocks 26 have thus been threaded, their engagement with the relatively rotating guide 22 will continue downward feed of the guide 21 along the entire length of the hob 24 and thence along the pilot 25 which is a continuation of the thread of the hob, with the frame 16 and its depending rod 58 traveling downwardly with the guide 21. The rod 58 will thus slide freely through the forked end of the rod 51 until the guide 21 has cleared the hob 24 and is in engagement with the upper end of the pilot 25, whereupon the abutment 57 engages the forked end of the rod 51. Downward feed of the guide 21 along the pilot 25 then continues in accordance with the latter portion of the cycle of operation previously described, i. e. the abutment 57 shifts the switch 50 so as to first open its contacts 54—56 and then close its contacts 53—55 for shunting out the relay 84 and thus arresting the cycle of operation when the blocks 26 are again at the lower end of the pilot 25 and the piston 14 is at the lower end of its cylinder 13.

The blocks 26 having thus been threaded by the hob 24 and the parts returned to normal position, the machine is ready for tapping operation. The support 4 is adjusted on the column 3 so that the range of travel of table 5 will feed the work for tapping operation by the tap 35 and for then retracting the work from the tap; and by adjusting the contact 56 the feed of the table 5 is automatically reversed when the work has been tapped to any predetermined depth. The switch 75 having been closed, the machine is then adapted for cyclic tapping operation each time the switch 65 is depressed, with operation completely arrested at the end of each cycle of operation and until the switch 65 (having been released for spring projection to position closing its upper contacts) is again depressed for closing its lower contacts.

Referring to the modification of the invention shown at Figs. 9 to 11, a rotatable spindle 102 is journaled in the head 101 of a turret lathe, the bed of which is shown at 103. A usual chuck (not shown) supports the work and is fixed for rotation with the spindle 102 for rotating the work relative to a non-rotatable tool. A saddle 104 is adjustable along the bed 103 by usual means (not shown), and a ram 106 is shiftable along the saddle 104 by a manual control 105. A head 107 on the ram, supports a plurality of tools so that rotatably adjusting the head 107 alines any desired tool with the rotating work. The tools are fixed against rotation relative to the head 107 and the shiftable ram is adapted to axially feed the selected tool relative to the rotating work. In the drawings, the tool which is alined with the work is a tap 35a which is adapted for non-rotatable axial feed relative to the rotating work for tapping the work in accordance with the pitch of the tap.

The ram 106, in addition to feed by the manual control 105, is adapted for axial feed relative to the rotating work by operating means such as previously described, i. e. by a fluid-displacement operating connection which is actuated by relative rotation and resulting relative axial displacement of interfitting threaded-guides, the relative rotation of which is produced by the rotatable spindle 102. The elements of this operating means which correspond to those previously described in connection with Figs. 1 to 7, are indicated by the same reference numerals with the exponent a.

Pistons 11a—14a are adapted for reciprocation in cylinders 10a—13a which are mounted on the saddle 104 and on the head 101 respectively, with the cylinders connected by conduits 19a—20a (which include flexible portions 40a—41a). This fluid-displacement system contains a substantially non-compressible medium such as oil, and is automatically maintained filled to capacity by compensating chamber 45a which communicates with pump 42a and reservoir 43a.

In the illustrated embodiment, the threaded-guide 22a is fixed against axial displacement and is rotatable by the spindle 102, and the cooperating threaded-guide 21a is fixed against rotation and is axially displaceable, with its supporting frame 16a connected to the piston rod 15a. Guide rod 17a of the frame 16a is slidable in bearing guide 18a on the cylinder 13a.

Piston rod 12a is releasably connected to the ram 106. As an instance, this piston rod is guided in a bearing 110 on the saddle 104, and an arm 111 is journaled on the rod 12a and is adjustable along the rod and is then fixed against axial displacement relative to the rod as shown at 112. The arm 111 is adapted to be manually swung clear of the ram 106 for use of the machine without thread-leading means, i. e. when a tool other than the tap 35a is in use and the ram 106 is fed by its manual control 105; and the arm 111 is adapted to be swung to position seating in a recess 113 of the ram 106 when the machine is to be used with thread-leading means, i. e. when the tap 35a is to be used.

The threaded-guide 21a comprises blocks 26a mounted on arms 27a which are pivoted in the frame 16a and which have a linked operating connection (not shown), similar to the means 30—31 previously described in connection with the threaded-guide 21, for engaging the blocks 26a with the cooperating threaded-guide 22a when actuating rod 29a is retracted by energizing the solenoid 66a, and for swinging the blocks 26a clear of the cooperating threaded-guide 22a when the solenoid is deenergized. The linked operating connection includes means (not shown), similar to the means 32—33—34 previously described in connection with the threaded-guide 21, whereby when the blocks 26a have been swung to operative position they are spring tensioned for maintaining snug engagement with the cooperating threaded-guide 22a.

The threaded-guide 22a includes hob 24a and pilot 25a, and is mounted on shaft 23a which is journaled in the head 101 and is driven by the spindle 102 through the selective-speed driving connection 39a.

The spindle 102 may be driven by a reversible motor, in which case an electrical control such as previously described may be employed. With such construction, the two-way switch of the electrical control (corresponding to the switch 50 previously described) would be operated by a rod and abutment corresponding to the previously described rod and abutment 58—57, with the rod forming a continuation of the guide rod 17a.

However, the invention is applicable and is illustrated in connection with a turret lathe structure in which rotation of the spindle 102 is manually reversed. For this embodiment of the invention, the electrical control previously described may be eliminated, and rotation of the spindle 102 may be started and stopped and reversed, by a usual manually controlled clutch (not shown); and the solenoid 66a may be energized and deenergized at the beginning and end of the cycle of operation by a usual manually operated electrical switch (not shown).

Before using the turret lathe, a thread is cut in the blocks 26a by means of the relatively rotating hob 24a. For this purpose, the arm 111 is swung clear of the cooperating recess 113, and with the solenoid 66a deenergized so that the blocks 26a (with no thread cut therein) are clear of the cooperating guide 22a, the frame 16a and the guide 21a are shifted along the guide 22a until the blocks 26a are opposite that end of the hob 24a which is remote from the pilot 25a. The solenoid 66a is then energized so as to engage the blocks 26a with the hob 24a, and the clutch for the spindle 102 is manually actuated so as to start rotation of the spindle 102 and the shaft 23a in the direction for rotating the hob so as to thread the blocks 26a by movement of the latter along the relatively rotating hob, toward the pilot 25a. As soon as the thread has been started in the blocks, the pitch of the hob feeds the blocks relative to the hob for completing the thread; and the threaded-blocks are then fed along the length of the hob 24a and thence along the pilot 25a, the thread of which is a continuation of the thread of the hob. The frame 16a travels with the guide 21a, until the piston 14a is at that end of the cylinder 13a which positions the threaded-blocks 26a opposite that end of the pilot 25a which is remote from the hob 24a, whereupon the solenoid 66a is manually deenergized so as to release the engagement between the cooperating threaded-guides 21a—22a.

The turret lathe is then ready for operation. If a tool other than the tap 35a is to be used and the manual control 105 is to be employed, the switch for the solenoid 66a is left open so that the cooperating threaded-guides 21a—22a remain disengaged, and the arm 111 is left in position swung clear of the cooperating recess 113. The machine is thus adapted for operation independently of the cooperating threaded-guides 21a—22a, i. e. the saddle 104 may be adjusted along the bed 103 and the ram 106 may then be fed relative to the rotating work by the manual control 105.

When the tap 35a is to be used, relative axial displacement of the cooperating threaded-guides 21a—22a provides the lead for the tapping operation. The saddle 104 is adjusted along the bed 103 and the rod 111 is adjusted along the rod 12a and is then swung to position seating in the recess 113, for positioning the tap 35a so that its range of feed, as determined by threaded displacement of the blocks 26a along the pilot 25a, will feed the tap relative to the rotating work so as to first tap the work and then retract the tap from the work.

The selective speed driving connection 39a is manually adjusted to provide a drive ratio for the shaft 23a whereby the pitch of the cooperating threaded-guides 21a—22a provides a lead which adapts the machine for use of a tap 35a which may have the same pitch as that of the cooperating threaded-guides or which may have a pitch different from that of the cooperating threaded-guides, as determined by the selected drive ratio.

The piston 14a being at the end of its cylinder 13a with the blocks 26a being opposite that end of the pilot 25a which is remote from the hob 24a, fluid in the cylinders 10a—13a and in the conduits 19a—20a will have been so displaced that the piston 11a is at that end of its cylinder 10a whereby the operating connection 111—113 will have shifted the ram 106 so that the tap 35a clears the work which is mounted on the spindle 102. The solenoid 66a is then energized for engaging the cooperating threaded-guides 21a—22a; and the clutch for the spindle 102 is manually engaged so as to rotate the spindle in the direction for tapping operation by the cooperating tap 35a, with the shaft 23a rotating in the direction for feeding the guide 21a along the pilot 25a, toward the hob 24a. The frame 16a which travels with the guide 21a, thus shifts the piston 14a in its cylinder 13a, and correspondingly shifts the piston 11a in its cylinder 10a, so that the connection provided by the arm 111 shifts the ram 106 along its saddle 104, for axial feed of the tap 35a relative to the rotating work, for tapping the work in accordance with the feed.

When the work has been tapped to the desired depth, as indicated to the operator in any usual manner, the clutch for the spindle 102 is manually actuated so as to reverse its rotation. The solenoid 66a being still energized for maintaining threaded engagement of the cooperating guides 21a—22a, the guide 21a (and the frame 16a) is thus shifted in the opposite direction relative to the now reversely rotating guide 22a; and the work which is supported by the spindle 102 is rotated in the reverse direction. The fluid-displacement operating connection thus reverses the feed of the ram 106 for threaded retraction of the tap 35a from the tapped work. When the tap is clear of the work, with the pistons 14a—11a again at the ends of their cylinders 13a—10a, the solenoid 66a is deenergized by manually actuating its control switch, thereby disengaging the cooperating threaded-guides 21a—22a and thus arresting operation; and the clutch for the spindle 102 is manually actuated so as to stop rotation of the work, thereby positioning the parts ready for repeating the cycle of tapping operation or for use of any other of the tools which are mounted in the head 107.

I claim:

1. In a machine tool, cooperating mountings adapted for adjustment relative to one another, cooperating elements comprising a tool holder and a work holder carried by the respective mountings and adapted for rotation of one element relative to its mounting and movement of the other element relative to its mounting for axial displacement relative to the rotatable element, cooperating threaded-guides adapted for rotation of one guide by the rotatable element for relatively axially displacing the guides, cylinders carried by the respective mountings, pistons in the respective cylinders connected to the axially displaceable guide and to the axially displaceable element respectively, and fluid conduits providing communication between the cylinders for dependent fluid-displacement of the pistons for thread-lead of the axially displaceable element relative to the rotatable element, the fluid conduits including means for maintaining said communication throughout relative adjustment of the cooperating mountings.

2. In a machine tool, cooperating mountings, cooperating elements comprising a tool holder and a work holder carried by the respective mountings and adapted for rotation of one element relative to its mounting and movement of the other element relative to its mounting for axial displacement relative to the rotatable element, cooperating threaded-guides adapted for rotation of one guide by the rotatable element for relatively axially displacing the guides, cylinders carried by the respective mountings, pistons in the respective cylinders connected to the axially displaceable guide and to the axially displaceable element respectively, and fluid conduits providing communication between the cylinders for dependent fluid-displacement of the pistons for thread-lead of the axially displaceable element relative to the rotatable element.

3. In a machine tool, cooperating elements comprising a tool holder and a work holder adapted for rotation of one element and relative axial displacement of the other element, cooperating threaded-guides adapted for rotation of one guide by the rotatable element for relatively axially displacing the guides, and an operating connection between the axially displaceable guide and the axially displaceable element for thread-lead of the latter relative to the rotatable element, the operating connection comprising a fluid displacement system having means for automatically compensating for leakage.

4. In a machine tool, cooperating mountings, cooperating elements comprising a tool holder and a work holder carried by the respective mountings and adapted for rotation of one element relative to its mounting and movement of the other element relative to its mounting for axial displacement relative to the rotatable element, cooperating threaded-guides adapted for rotation of one guide by the rotatable element for relatively axially displacing the guides, cylinders carried by the respective mountings, pistons in the respective cylinders connected to the axially displaceable guide and to the axially displaceable element respectively, fluid conduits providing communication between the cylinders for dependent fluid-displacement of the pistons for thread-lead of the axially displaceable element relative to the rotatable element, supply conduits leading to said fluid conduits, check valves in said supply conduits adapted to open from the supply conduits into the fluid conduits, a reservoir, a compensating chamber having a spring tensioned piston adapted for retraction responsive to fluid pressure, and means for pumping fluid from the reservoir into the compensating chamber and thence into the supply conduits.

5. In a machine tool, cooperating elements comprising a tool holder and a work holder adapted for rotation of one element and displacement of the other element axially of the rotatable element, cooperating threaded-guides adapted for engagement for rotation of one guide by the rotatable element for relatively axially displacing the guides, an operating connection between the axially displaceable guide and the axially displaceable element for thread-lead of the latter relative to the rotatable element, and a control for dependently engaging the cooperating threaded-guides and rotating the rotatable element in direction for threading the work, the control including means for automatically reversing rotation of the rotatable element at predetermined limit of threading operation for threaded withdrawal of the tool from the threaded work, and the control including means for automatically and dependently disengaging the cooperating threaded-guides and arresting rotation of the rotatable element at predetermined withdrawal of the tool from the threaded work.

6. In a machine tool, cooperating elements comprising a tool holder and a work holder adapted for rotation of one element and displacement of the other element axially of the rotatable element, cooperating threaded-guides adapted for engagement for rotation of one guide by the rotatable element for relatively axially displacing the guides, an operating connection between the axially displaceable guide and the axially displaceable element for thread-lead of the latter relative to the rotatable element, and a control for dependently engaging the cooperating threaded-guides and rotating the rotatable element in direction for threading the work, the control including a switch and actuating means shiftable by the displaceable guide for actuating the switch so as to reverse rotation of the rotatable element at predetermined limit of threading operation for threaded withdrawal of the tool from the threaded work, said actuating means being shiftable by the displaceable guide for actuating the switch so as to disengage the cooperating threaded-guides and arrest rotation of the rotatable element at predetermined withdrawal of the tool from the threaded work.

7. In a threading machine, a rotatable spindle fixed against axial displacement and rotatably supporting a threading tool, a work support axially movable relative to the spindle, a threaded-guide fixed against axial displacement and rotatable by the spindle, a cooperating threaded-guide fixed against rotation and adapted for axial displacement by threaded-engagement with the rotatable threaded-guide, and a fluid-displacement operating connection between the axially displaceable threaded-guide and the work support for thread-lead of work on the support relative to the rotatable spindle.

8. In a threading machine, a rotatable work support fixed against axial displacement, a ram movable axially of the rotatable work support, a tool element on the ram, a threaded-guide fixed against axial displacement and rotatable by the work support, a cooperating threaded-guide fixed against rotation and adapted for axial displacement by threaded-engagement with the rotatable threaded-guide, and a fluid-displacement operating connection between the axially displaceable threaded-guide and the ram for thread-lead of the tool element relative to work on the work support.

9. In a threading machine, a rotatable work support fixed against axial displacement, a ram movable axially of the rotatable work support, a tool element on the ram, a threaded-guide fixed against axial displacement and rotatable by the work support, a cooperating threaded-guide fixed against rotation and adapted for axial displacement by threaded-engagement with the rotatable threaded-guide, an operating connection between the axially displaceable threaded-guide and the ram for thread-lead of the tool element relative to work on the work support, and means adapted for disengagement for movement of the ram independently of the operating connection.

10. In a machine tool, cooperating elements comprising a tool holder and a work holder adapted for rotation of one element and relative axial displacement of the other element, cooperating threaded-guides separate and distinct from work which is supported by the work holder and adapted for rotation of one guide by the rotatable element for relatively axially displacing the guides, and a fluid-displacement operating connection between the axially displaceable guide and the axially displaceable element for thread-lead of the latter relative to the rotatable element.

11. In a machine tool, cooperating mountings, cooperating elements comprising a tool holder and a work holder carried by the respective mountings and adapted for rotation of one element relative to its mounting and movement of the other element relative to its mounting for axial displacement relative to the rotatable element, the said mountings being adapted for relative adjustment axially of the rotatable element, cooperating threaded-guides separate and distinct from work which is supported by the work holder and adapted for rotation of one guide by the rotatable element for axial displacement of the other guide relative to the rotatable guide and relative to the mounting for the axially displaceable element, and an operating connection between the axially displaceable guide and the axially displaceable element for thread-lead of the latter relative to the rotatable element, the operating connection including means for maintaining its operative engagement throughout relative axial adjustment of the cooperating mountings.

12. In a machine tool, cooperating mountings, cooperating elements comprising a tool holder and a work holder carried by the respective mountings and adapted for rotation of one element relative to its mounting and movement of the other element relative to its mounting for axial displacement relative to the rotatable element, cooperating threaded-guides separate and distinct from work which is supported by the work holder and adapted for rotation of one guide by the rotatable element for axial displacement of the other guide relative to the rotatable guide and relative to the mounting for the axially displaceable element, cylinders carried by the respective mountings, pistons in the respective cylinders connected to the axially displaceable guide and to the axially displaceable element respectively, and fluid conduits providing communication between the cylinders for dependent fluid-displacement of the pistons for thread-lead of the axially displaceable element relative to the rotatable element.

13. In a machine tool, cooperating mountings, cooperating elements comprising a tool holder and a work holder carried by the respective mountings and adapted for rotation of one element relative to its mounting and movement of the other element relative to its mounting for axial displacement relative to the rotatable element, cooperating threaded-guides separate and distinct from work which is supported by the work holder and adapted for rotation of one guide by the rotatable element for axial displacement of the other guide relative to the rotatable guide and relative to the mounting for the axially displaceable element, and a fluid-displacement system comprising cylinders carried by the respective mountings, pistons in the respective cylinders, connected to the axially displaceable guide and to the axially displaceable element respectively, and fluid conduits providing communication between the cylinders for dependent fluid-displacement of the pistons for thread-lead of the axially displaceable element relative to the rotatable element, said fluid-displacement system having means for automatically compensating for leakage.

14. In a machine tool, cooperating elements comprising a tool holder and a work holder adapted for rotation of one element and displacement of the other element axially of the rotatable element, cooperating thread-leading members separate and distinct from work which is supported by the work holder and comprising a driving member and a driven member adapted for engagement for rotation of the driving member by the rotatable element for thread-leading movement of the driven member, and a fluid-displacement operating connection between the driven member and the axially displaceable element for thread-leading the latter relative to the rotatable element.

HARDING F. BAKEWELL.